United States Patent Office 3,296,314
Patented Jan. 3, 1967

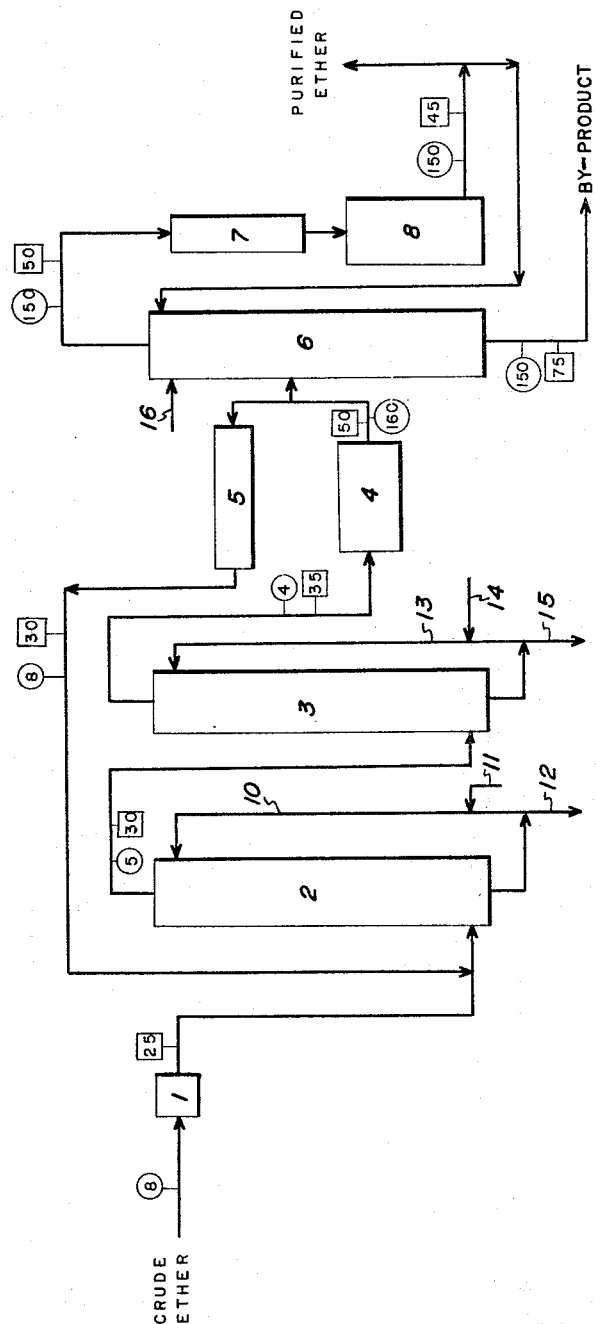

3,296,314
PROCESS FOR PURIFYING METHYL ETHER
Harold W. Burns, Woodbury, N.J., and Frederick J. Sebelist, Chadds Ford, Pa., assignors to E. I. du Pont de Nemours and Company, Wilmington, Del., a corporation of Delaware
Filed Nov. 12, 1963, Ser. No. 322,918
5 Claims. (Cl. 260—616)

This invention concerns a process for purifying methyl ether, and more specifically a process for purifying by-product methyl ether which contains oxides of nitrogen, including chemically complexed and combined oxides of nitrogen.

Best known among the simple alkyl ethers in ethyl ether, sometimes called diethyl ether, which is manufactured in various ways such as by action of sulfuric acid on ethanol, by action of dehydrating catalysts on ethanol vapor, and by action of ethylene with sulfuric acid. Said ether is purified by a variety of processing steps designed to eliminate impurities contained in the crude ethyl ether. Generally speaking, these impurities include ethanol, water, sulfur dioxide, sulfuric acid, unsaturated hydrocarbons, ether peroxides, aldehydes, esters, and small amounts of odoriferous and color-generating impurities. A large number of processes for purification of ethyl ether have been devised and disclosed. In addition to simple water-washing followed by fractional distillation, purification treatments generally have included scrubbing with dilute aqueous alkalines, and sometimes, in addition, one or more of a variety of chemical treatments using zinc halides, aluminum chloride, chlorine, bisulfites, hydroxylamine, mercuric oxide, silver oxide, alkaline potassium permanganate solutions, benzidine, resorcinol, catalytic hydrogenation, sodium plumbite, and perhaps other reagents.

Because of the similarity of properties of the simple alkyl ethers, persons skilled in the chemical art may anticipate that processes effective in the purification of ethyl ether or other low molecular weight alkyl ethers also would be effective in the purification of methyl ether, after making suitable adjustments for the differences in physical properties of methyl ether. Such a conclusion, however, is not valid with reference to the purification of by-product methyl ether which is formed by the catalytic action of sulfuric acid on methanol during the manufacture of dimethyl terephthalate, for example, as described in Canadian Patent 621,411, using terephthalic acid obtained by the nitric acid oxidation of a p-dialkyl benzene, for example terephthalic acid made by the process described in United States Patent 2,636,899. Although methyl ether is obtained in relatively small proportion as a by-product in the manufacture of dimethyl terephthalate, the amount of the latter is so great that a substantial amount of methyl ether also is available for recovery and use, for example, as a solvent, as a propellant in aerosols, or in the manufacture of dimethyl sulfate.

Methyl ether originating as a by-product from the sulfuric acid-catalyzed methanol esterification of terephthalic acid prepared by nitric acid oxidation of a p-dialkyl benzene when recovered and purified by conventional techniques is not satisfactory for uses such as those indicated because the ether contains impurities which gradually decompose, more rapidly on heating, with liberation of red-colored nitrogen oxide fumes. This deficiency in the quality of methyl ether from the indicated source now has been overcome by an improvement in conventional processes for purifying alkyl ethers. In accordance with this invention, in a process for the purification of methyl ether containing oxides of nitrogen, one subjects the methyl ether to the scrubbing action of an aqueous acidic solution of an —$NH_2$ containing compound selected from the group consisting of primary amines and amides of carbonic, carboxylic, and sulfuric acids.

The invention may be more readily understood by referring to the schematic drawing in connection with the detailed description of the ether purification process.

In the drawing the numbers in small circles show approximate gage pressure in pounds/square inch (p.s.i.g.), and the numbers in small squares show the approximate temperature in degrees centigrade for material in the pipe lines and processing units in a preferred embodiment of the invention. The arrows show the directions of flow of materials through the processing equipment.

Vapors of crude methyl ether containing oxides of nitrogen pass through line condensate separator 1 to remove methanol, water, and other condensible fluids from the vapors of crude methyl ether before they enter scrubber 2. Scrubber 2 is an acid-resistive, packed column, tray column, or other apparatus suitable for efficient continuous contacting of gas by a scrubbing liquid. The scrubbing liquid used is a dilute aqueous acid solution of the kind defined above and more specifically described hereinafter. Provision is made for circulating the acidic scrubbing liquid via line 10 countercurrently to the gas flow, adding additional liquid through line 11, and removing spent scrubbing liquid by line 12.

The scrubbed vapors of methyl ether pass out of the top of scrubber 2 and enter the bottom of alkali scrubber column 3 which also may be of any design suitable for efficient, continuous, gas-liquid contacting. Provision is made for circulating aqueous alkaline scrubbing liquid via line 13 through column 3 countercurrently to the gas flow, adding additional alkaline solution through line 14, and withdrawing spent scrubbing liquid by line 15.

The effluent scrubbed gas from the top of column 3 passes to a two-stage compressor 4 wherein the vapors are compressed at about 160 lbs./in.² gage to form a slightly superheated vapor, largely methyl ether, which is fed to fractionating column 6 operating at approximately 150 p.s.i.g. The compressor discharge may be in the range about from 40 to 200 p.s.i.g. provided that discharge temperature is high enough that there is substantially no condensation of vapors. Heat for the distillation is supplied partly by the incoming vapor and partly by a calandria, not shown, at the base of column 6. As indicated in the drawing, provision is made for return of methyl ether to scrubber 2 via aftercooler 5 and a pressure let down system, not shown.

The overhead vapors from fractionating column 6 pass into condenser 7 and receiver 8 from which the purified methyl ether may be returned in part as reflux liquid for column 6, or may be withdrawn for use or shipment. Provision also is made for addition of dilute caustic solution through line 16 to the upper part of fractionating column 6 in an amount sufficient to insure that the heels from the column do not become acidic, and preferably do not drop below a pH of 10.

The crude methyl ether vapor to scrubber 2 can vary widely in composition. The following is illustrative of the composition of crude methyl ether feed if obtained as a by-product from sulfuric acid methanol esterification of terephthalic acid prepared by nitric acid oxidation of a p-dialkyl benzene.

| | Percent by weight |
|---|---|
| Methyl ether | 90 (min.) |
| Methanol | 0.5–4.0 |
| Water (about) | 1.2 |
| Carbon dioxide | 0.25–7.0 |
| Methylformate and other low-boiling constituents | 0.5–3.0 |
| Methyl nitrite | <0.001–3.0 |
| Oxides of nitrogen | <0.005–0.1 |
| Nitrogen oxides-methyl ether complex | 0.05 (max.) |

The exact nature of the complexes of methyl ether with nitrogen oxides is not known, but these can be substantially completely eliminated, together with the dissolved oxides of nitrogen and the methyl nitrite, by the process of the invention.

The scrubbing liquid in scrubber 2 consists of an aqueous acidic solution of an —$NH_2$ containing compound selected from primary amines and amides of carbonic, carboxylic, or sulfuric acids. Such acidic solution is obtained by use of an acidic —$NH_2$ containing compound such as sulfamic acid or by combining one or more of the —$NH_2$ containing compounds with an inorganic acid of low volatility such as phosphoric or sulfuric acids.

Preferred —$NH_2$ containing compounds for use in the process of the invention are aliphatic amines, alicyclic primary amines, and aromatic primary amines having a boiling point greater than 50° C. at 1 atmosphere pressure and soluble to the extent of at least 0.1% in dilute acid, and acid amides unsubstituted on the N atom and having a solubility of at least 0.1% in water or dilute acid at 25° C. Illustrative of such compounds are cyclohexylamine, n-butylamine, iso-butylamine, benzyl amine, monoethanolamine, aniline, acetamide, benzamide, urea and sulfamic acid. Particularly preferred because of their effectiveness, economy and convenience are the diamide of carbonic acid (urea) and the monoamide of sulfuric acid (sulfamic acid).

The concentration of inorganic acid in the scrubbing solution will range about from 0.1 to 5%, and the concentration of amine or amide about from 0.1 to 5% by weight. Generally preferred scrubber solutions will contain about 2% by weight each of inorganic acid and the —$NH_2$ containing compound, and especially preferred are scrubber solutions containing about 2% sulfuric acid and 2% urea, or 2% sulfuric acid and 2% sulfamic acid. The sulfamic acid may be used alone at concentrations of 0.1 to 5%, because soon after start up, sulfuric acid is generated by the reaction of sulfamic acid with nitrous acid, thereby providing the sulfuric acid component of the preferred scrubbing solution.

The temperature of the acidic solution in scrubber 2 is not critical, and conveniently will be at ambient atmospheric temperature, or somewhat above, generally in the range of 15° C.–50° C.

The scrubbing liquid in column 3 is an alkaline solution, preferably a sodium hydroxide solution of 2 to 18%, and preferably of 4.0 to 6.0% concentration by weight. The ratio by weight of circulating scrubbing liquid to the methyl ether processed through column 3 per hour is generally less than 5 and preferably is about 3. The alkaline solution removes carbon dioxide, low boiling esters and entrained acid carried over from scrubber 2.

Methanol and water are separated from the methyl ether by fractional distillation in continuously operating fractionating column 6 after compression of the methyl ether vapors in compressor 4. The pressure under which column 6 is operated preferably is about 150 p.s.i.g. but can be varied as desired so long as effective recovery of methyl ether is obtained in condenser 7 with the available cooling means. The reflux ratio in column 6, provided by cycling purified methyl ether from receiver 8 to column 6, is generally not greater than 4 and preferably is 1 to 1.

*Example*

In the following detailed example, the methyl ether purification is carried out using the processing steps, temperatures and pressures shown in the drawing.

Crude methyl ether vapor having a composition like that shown in the tabulation above is fed to scrubber 2 at a rate of 600 lbs./hr. together with a recycle stream of purified methyl ether from aftercooler 5 to make a total flow of 1200 lbs./hr.

The methyl ether vapor flows upward through scrubber 2 counter-current to a flow of 9600 lbs./hr. of water containing 2% sulfuric acid and 2% sulfamic acid, 150 lbs./hr. of which is fresh solution and the remainder is recycle.

Scrubber 2 is a column having a free volume of 52 cubic feet packed with ½" Raschig rings.

The methyl ether vapors are removed overhead from scrubber 2 and passed to the base of alkali scrubber column 3 wherein they flow counter-current to 4000 lbs./hr. of a 6% sodium hydroxide solution, 100 lbs./hr. of which are fresh sodium hydroxide solution, and the remainder recycle. Alkali scrubber column 3 is a steel column 15" I.D. x 24'8" in height and packed with 1" Raschig rings to a depth of 16 ft.

Methyl ether vapors leave overhead from alkali scrubber column 3, are compressed in compressor 4, and fed to the mid-section of fractionating column 6. Column 6 is packed with 20 ft. of ½" Raschig rings and is 20" in diameter. An 18% sodium hydroxide solution in water is fed to the top of the column at the rate of about 30 lbs./hour.

Refined methyl ether is removed from the top of column 6 at the rate of 1160 lbs./hr., 600 lbs. of which, after being condensed, is returned to column 6 as recycle to give a reflux ratio of 1:1 and the remainder of which purified methyl ether is removed as product. The product has the following analysis.

| | Percent by weight |
|---|---|
| Carbon dioxide | 0.2 |
| Water | 0.1 |
| Methanol | 0.05 |
| Methyl nitrite | 0.04 |
| Nitrogen oxides and complex with methyl ether | 0.04 |
| Other organic materials | 0.05 |
| Methyl ether | Balance |

The above methyl ether is suitable for chemical use in contrast to that obtained without including the initial step of scrubbing with an acidified solution of —$NH_2$ containing compound in scrubber 2.

It is to be understood that the foregoing is by no means limitative of the invention, which may be variously otherwise embodied, for instance, as to concentrations and composition of acidic scrubbing solutions, and as to combination with additional processing procedures.

What is claimed is:

1. In a process for purifying methyl ether containing oxides of nitrogen, the step of scrubbing said methyl ether in the vapor phase with an aqueous acidic solution containing about from 0.1 to 5% by weight of an inorganic acid selected from the group consisting of sulfuric acid and phosphoric acid and about from 0.1 to 5% by weight of an —$NH_2$ containing compound selected from the group consisting of sulfamic acid and urea.

2. In a process for purifying methyl ether containing oxides of nitrogen, the step of scrubbing said methyl ether in the vapor phase with an acidic solution containing about from 0.1 to 5% by weight of sulfuric acid and about from 0.1 to 5% by weight of urea.

3. In a process for purifying methyl ether containing oxides of nitrogen, the step of scrubbing said methyl ether in the vapor phase with an acidic solution containing about from 0.1 to 5% by weight of sulfuric acid and about from 0.1 to 5% by weight of sulfamic acid.

4. In a process for purifying methyl ether containing oxides of nitrogen, the step of scrubbing said methyl ether in the vapor phase with an acidic solution containing about from 0.1 to 5% by weight of sulfamic acid.

5. A process for purifying methyl ether containing nitrogen oxides which comprises successively and in continuous manner:
- (a) scrubbing said methyl ether by passing the vapors thereof continuously in countercurrent flow through a solution consisting of water containing about from 0.1 to 5% by weight of sulfuric acid and about from 0.1 to 5% by weight of an —$NH_2$ containing compound selected from sulfamic acid and urea,
- (b) scrubbing vapors from (a) by passing said vapors continuously in countercurrent flow through an aqueous solution containing about from 4 to 6% of sodium hydroxide,
- (c) compressing vapors from (b) to about 160 pounds per square inch gage while maintaining the temperature of the compressed vapors above the condensation temperature,
- (d) continuously distilling vapors from (c) through a fractionating column operating at about 150 pounds per square inch gage, and
- (e) condensing the overhead vapors from said fractionating column of (d) to recover purified liquid methyl ether.

No references cited.

LEON ZITVER, *Primary Examiner.*

H. T. MARS, *Assistant Examiner.*